Patented Oct. 25, 1949

2,485,669

UNITED STATES PATENT OFFICE 2,485,669

POULTRY FEEDING COMPOSITION

Clarence W. Sondern, Mendham, N. J., assignor to White Laboratories, Incorporated, Newark, N. J., a corporation of New Jersey No Drawing. Application April 28, 1945, Serial No. 590,968

8 Claims. (Cl. 99—4)

This invention relates to a composition for feeding poultry, particularly to a feeding composition effective in promoting fattening of poultry.

There has long been felt a need for a poultry feeding composition which would enable one to force the growth of a bird so that it would reach a size and degree of fatness suitable for marketing in a shorter time than is possible when feeding the heretofore available so-called balanced rations. In attempting to develop a feeding ration for poultry which would accomplish this purpose, synthetic substances having biological effects like those of the estrogenic hormones, e. g., diethylstilbestrol, hexestrol, and ethinyl estradiol, have been incorporated in feeding mixtures but without substantial success. Although in some instances a slight increase in the fat deposition has been noted when such substances have been administered orally, this increase has invariably been so small as to be without commercial significance. It is known that the subcutaneous or intramuscular injection of estrogenic hormones and certain of the compounds just mentioned into old cocks is effective in promoting the development of feminine characteristics. Insofar as I am aware no attempt has been made to increase the rate of fattening of young poultry by the oral administration of hormones or of compounds having a similar biological effect.

It has now been found that, contrary to expectations, certain methyl ether derivatives of diethylstilbestrol and of compounds related chemically thereto, are effective when incorporated in small amounts in the feeding rations of chickens, turkeys, ducks, geese and other poultry, not only in suppressing the sexual characteristics of male individuals, but also as agents for increasing the rate of fattening of both male and female individuals substantially over the rate of fattening observed when feeding a ration similar in every respect except for the omission of the novel agents. The compounds which have been found effective are 3,4-di(p-methoxyphenyl)-n-hexane (the dimethyl ether of hexestrol), 3,4-di(p-methoxyphenyl)-n-hexene-3, (the dimethyl ether of diethylstilbestrol), and 3,4-di(p-methoxyphenyl)-n-hexadiene-2,4. The activity of these compounds in promoting a rise in the blood fat level and thus in contributing to a more rapid fattening of the fowl is not to be expected from a consideration of the results obtained in studying the comparative effects of related compounds when injected subcutaneously into poultry or when administered orally to mammals. It has, heretofore, generally been accepted that the estrogenic effect of diethylstilbestrol and substances related thereto is either substantially destroyed or greatly reduced when the phenolic hydroxyl groups are converted to ethers.

The feeding composition of the invention may be prepared readily by dispersing or mixing a compound selected from the group consisting of 3,4-di(p-methoxyphenyl)-n-hexane, 3,4-di(p-methoxyphenyl)-n-hexene-3, and 3,4-di(p-methoxyphenyl)-n-hexadiene-2,4, herein referred to as a methylated estrogenic substance, with any otherwise desirable feeding composition for poultry. The methylated estrogenic substance is incorporated in the feed in any desired amount less than about 200 milligrams per pound of feed. When less than about 25 milligrams of the substance is used per pound of feed the effect, although noticeable, is not as great as is usually desired. When more than about 200 milligrams of the methylated estrogenic substance is used per pound of feed, little, if any, increase in the effect is noted. Suitable proportions for commercial use have been found to be from about 25 to about 80 milligrams of the methylated estrogenic substances per pound of feed. Mixtures of methylated estrogenic substances may be used, if desired.

A methylated estrogenic substance may be incorporated in the feed mixture in any convenient manner such as by dissolving the substance in a solvent, preferably a non-toxic solvent, such as a vegetable or animal oil, e. g., cottonseed oil, corn oil, fish liver oil, sardine oil, and the like, and spraying the solution over the feed while it is being stirred, or by mixing the solid methylated estrogenic substance directly with the solid feed. In the latter instance effective mixing is promoted by first mixing the methylated estrogenic substance in finely powdered form with several times its weight of a finely powdered diluent and then incorporating the mixture in the feed material. In this way the difficulty of mixing thoroughly a very small amount of one solid substance with a relatively large amount of another solid substance is overcome. Obviously the diluent used should not be harmful to the fowl eating the final mixture and it may, if desired, be an advantageous constituent of the final feeding composition. In the case of feeds which are prepared by heating or cooking, the methylated estrogenic substance may be incorporated in the feed mixture either before or after heating.

Certain advantages of the invention are apparent from the following example which is given by way of illustration only and is not to be construed as limiting.

Example

A balanced ration for chickens was prepared containing oatmeal, hominy feed, wheat bran, wheat middlings, distillers dried grain, ground oats, pulverized barley, soybean oil meal, meat scraps, D-activated animal sterol, dried milk by-product, cane molasses, alfalfa meal, defluorinated phosphate, and iodized salt.

Three separate portions of the above mixture were taken and with each there was incorporated 45 milligrams per pound of feed, respectively, of 3,4-di-(p-methoxyphenyl)-n-hexane, 3,4-di(p-methoxyphenyl)-n-hexene-3, and 3,4-di(p-methoxyphenyl)-n-hexadiene-2,4. Three additional portions of the feed mixture were taken and each of the above agents respectively were incorporated therein at the rate of 60 milligrams per pound of feed.

The incorporation of the methylated estrogenic substances in the feed mixture was carried out in several different ways. In some instances, 4.5 milliliters of a one percent solution of methylated estrogenic substance in cottonseed oil was added by spraying to each pound of feed mixture while the latter was being mixed. The feed mixture was stirred until uniform distribution of the methylated estrogenic substance therein was obtained. In other instances, the methylated estrogenic substance was ground thoroughly with the soybean oil meal prior to the compounding of the feed mixture.

The feed mixtures containing the methylated estrogenic substances as described above and the mixture containing no methylated estrogenic substance were fed to separate lots of eight weeks old cockerels for a period of four weeks. The birds received no other food during the period of the test. At the end of the feeding period the birds were killed and autopsied. The abdominal adipose tissue weight was used as a measure of the fattening action of the treatment. In each instance the abdominal adipose tissue of the birds which had been fed with a feed mixture containing a methylated estrogenic substance was from three to four times that of the weight of abdominal adipose tissue of the birds which had been fed on the same feed mixture but without the addition thereto of a methylated estrogenic substance.

Similar determinations were made using 45 and 60 milligrams of diethylstilbestrol per pound of feed instead of a methylated estrogenic substance. The weight of abdominal adipose tissue observed in birds fed on such mixtures was either no greater or only slightly greater than the weight of abdominal adipose tissue of birds fed the mixture containing no diethylstilbestrol or methylated estrogenic substance.

Similar results were obtained using twelve weeks old pullets and cockerels.

I claim:

1. A feeding composition for poultry which includes a compound selected from the group consisting of 3,4-di(p-methoxyphenyl)-n-hexane, 3,4,-di(p-methoxyphenyl)-n-hexene-3, and 3,4-di(p-methoxyphenyl)-n-hexadiene-2,4 in an amount less than about 200 milligrams per pound of feed.

2. A feeding composition as claimed in claim 1 wherein the said compound is present in an amount of from about 25 to about 80 milligrams per pound of feed.

3. A feeding composition for poultry which includes 3,4-di(p-methoxyphenyl)-n-hexane in an amount not to exceed about 200 milligrams per pound of feed.

4. A feeding composition for poultry which includes from about 25 to about 80 milligrams of 3,4-di(p-methoxyphenyl)-n-hexane per pound of feed.

5. A feeding composition for poultry which includes 3,4-di(p-methoxyphenyl)-n-hexene-3 in an amount not to exceed about 200 milligrams per pound of feed.

6. A feeding composition for poultry which includes from about 25 to about 80 milligrams of 3,4-di(p-methoxyphenyl)-n-hexene-3 per pound of feed.

7. A feeding composition for poultry which includes 3,4-di(p-methoxyphenyl)-n-hexadiene-2,4 in an amount not to exceed about 200 milligrams per pound of feed.

8. A feeding composition for poultry which includes from about 25 to about 80 milligrams of 3,4-di(p-methoxyphenyl)-n-hexadiene-2,4 per pound of feed.

CLARENCE W. SONDERN.

REFERENCES CITED

The following references are of record in the file of this patent:

UNITED STATES PATENTS

| Number | Name | Date |
|---|---|---|
| 2,393,570 | Salmon et al. | Jan. 22, 1946 |